(12) United States Patent
Breit et al.

(10) Patent No.: US 9,354,098 B2
(45) Date of Patent: May 31, 2016

(54) MEASURING CUP

(71) Applicant: Urban Trend LLC, Newport Beach, CA (US)

(72) Inventors: Oliver Breit, Hong Kong (CN); Robert G. Kushner, Hong Kong (CN)

(73) Assignee: Urban Trend, LLC, Newport Beach, CA (US)

( * ) Notice: Subject to any disclaimer, the term of this patent is extended or adjusted under 35 U.S.C. 154(b) by 243 days.

(21) Appl. No.: 14/098,737

(22) Filed: Dec. 6, 2013

(65) Prior Publication Data
US 2015/0160062 A1     Jun. 11, 2015

(51) Int. Cl.
*G01F 19/00* (2006.01)

(52) U.S. Cl.
CPC ........................................ *G01F 19/00* (2013.01)

(58) Field of Classification Search
CPC ...................................................... G01F 19/00
See application file for complete search history.

(56) References Cited

U.S. PATENT DOCUMENTS 4,913,555 A  *  4/1990  Maeda ..................... A23G 9/12
                                                         261/DIG. 16
5,799,567 A  *  9/1998  Dorner .................... A47J 27/14
                                                         177/132
6,263,732 B1     7/2001  Hoeting
7,306,120 B2    12/2007  Hughes

OTHER PUBLICATIONS

Pyrex 2 Cup Measuring Cup, Web Page, Shopworldkitchen.com, Item # 6001075, 2 pages.
OXO Angled Measuring Cup—2 Cup, Web Page, Oxo.com, Item # 70981V3, 1 Page.

* cited by examiner

*Primary Examiner* — Paul West
(74) *Attorney, Agent, or Firm* — Greenberg Traurig, LLP

(57) ABSTRACT

A measuring cup may have volumetric indicia printed along upper and lower surfaces of a reference member disposed near a central portion of a space encircled by a sidewall of the measuring cup. The volumetric indicia may be viewable from above the measuring cup while the cup is disposed on a horizontal countertop or work surface. When inverted, the volumetric indicia printed along a lower surface of the reference member may likewise be viewable from above. In essence, the measuring cup contains two receptacles for measuring volumes of substances. One receptacle is accessible from a "top" of the measuring cup, while another receptacle is accessible from a "bottom" of the measuring cup. The reference member eliminates the need to raise the measuring cup to eye level to check the volume of substance.

17 Claims, 6 Drawing Sheets

MEASURING CUP

FIELD OF THE DISCLOSURE

The present disclosure relates generally to measuring cups and, more particularly, to measuring cups having volumetric indicia that are readable from various angles, including from directly above the measuring cup.

BACKGROUND OF RELATED ART

Measuring cups are known in the art. One utility amongst many derived from a measuring cup is related to the ease with which volumetric indicia on the measuring cup may be read by a user. A variety of suitable units of measurement are currently used to indicate the volume of the substance within a measuring cup. Traditional measuring cups have indicia marked upon the measuring cup sidewall in such a manner that makes the indicia difficult to read, depending at least in part upon the degree of preciseness needed, the materials from which the measuring cup is manufactured, and the physical ability of the user, for example. In the case of a measuring cup that is made from transparent or translucent material, the most precise way to measure the substance contained therein is to place the measuring cup upon a level surface, pour a substance to be measured into the measuring cup, and then stoop down to the level of the measuring cup to attempt to visually detect the bottom of a liquid meniscus or to a level surface of solid substance. An alternative method to read the volumetric indicium corresponding to the volume of a substance in a transparent or translucent measuring cup is to lift the measuring cup to eye level and attempt to hold the measuring cup steady while visually detecting the appropriate volumetric indicium. In either case, the user of the measuring cup is looking in a generally horizontal direction to detect the volume.

Furthermore, prior art measuring cups that are opaque can be even more difficult to read than transparent or translucent measuring cups. To read the volume of a substance held within an opaque measuring cup, a user typically peers over an upper margin of the measuring cup to eyeball, as best possible, a level to which the substance risen, either by stooping to the measuring cup's level or by lifting the measuring cup to eye level.

While the methods described above for determining the volume of a substance in a measuring cup may seem simple enough for some users, these methods can prove to be difficult for others. Users with physical ailments, for example, may not only have substantial difficulty in stooping over to accurately read the volume of a substance in a measuring cup placed on a level surface, but may also be challenged to lift a measuring cup to eye level and hold the cup steady to read the volume of the substance held therein. Particularly when precise measurement of the volume of a substance within a measuring cup is critical to a task, the simple actions of bending over or lifting a measuring cup to eye level, which comes easy to some users, may become difficult and uncomfortable for others. And even for able-bodied users, having to adjust one's eye level to that of the measuring cup is, at the very least, inconvenient.

Measuring the volume of cooking ingredients using prior art measuring cups can also be frustrating. As mentioned above, it can be difficult for a user to stoop over to read the level of a substance when placed on a level surface or when lifted to eye level. An unsteady hand not only makes the volume of the substance difficult to determine when a measuring cup is lifted to eye level, but a user may spill the substance or even drop the measuring cup when attempting to do so.

Measuring cups are not limited in their utility to the kitchen, of course. They may also be used for measuring proper ratios of non-edible substances, such as gasoline, oil, and antifreeze, for example, the precise measurement of which may be critical. Other common household solutions such as toxic or caustic substances, for example, can be dangerous. When a measuring cup is filled with these solutions, the possibility of spilling them on the user or within the proximity of a child or a pet greatly increases when a measuring cup must be raised to eye level to determine the volume of the substance.

DETAILED DESCRIPTION

Figure 1:
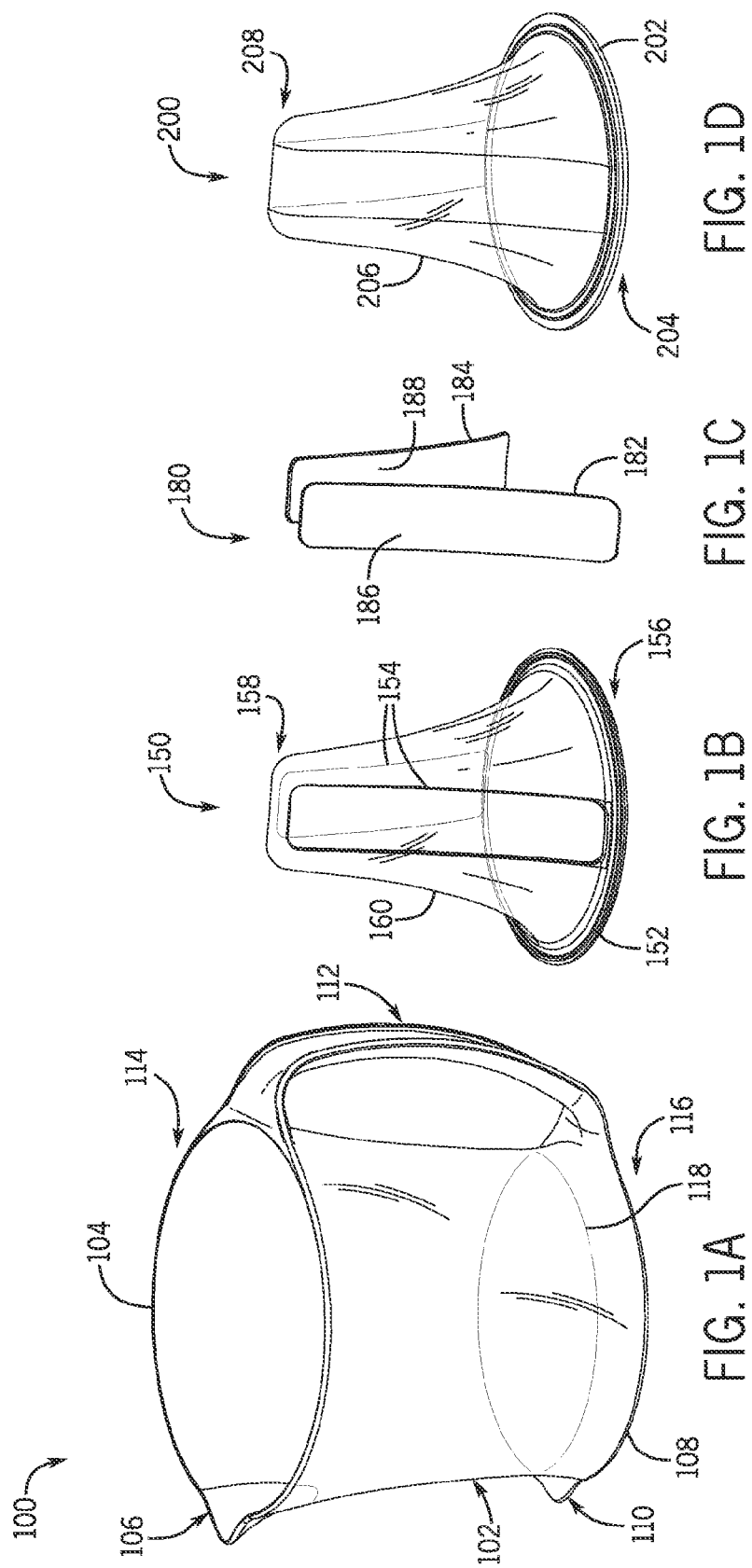
FIG. 1A is a front perspective view of an example subassembly of an example measuring cup.
FIG. 1B is a front perspective view of an example first portion of an example columnar ramp that can be utilized as a reference member and disposed within the example subassembly shown in FIG. 1A.
FIG. 1C is a front perspective view of an example printed insert that can be disposed adjacent to the example first portion of FIG. 1B.
FIG. 1D is a front perspective view of an example second portion of the example columnar ramp that can be disposed within the example subassembly shown in FIG. 1A.

Before any embodiments of the disclosure are explained in detail, it is to be understood that the disclosure is not limited in its application to the details of construction and the arrangement of components set forth in the following description or illustrated in the following figures. The example measuring cups are capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The term "affixed" is used broadly and encompasses both direct and indirect mounting, connecting, and coupling, whether direct or indirect. The following disclosure of example measuring cups and their components is not intended to limit the scope of the disclosure to the precise form or forms detailed herein. Instead the following disclosure is intended to be illustrative so that others may follow its teachings.

In general, an example measuring cup that solves the problems discussed above and improves the state of current measuring cups may have a sidewall that encircles a space, with the sidewall being at least partially defined by and/or having an upper periphery and a lower periphery. An upper spout may be disposed along the upper periphery, and in some examples, a lower spout may be disposed along the lower periphery. Moreover, a reference member may be disposed substantially at a central portion of the space encircled by the sidewall. The reference member may in some examples have an outer periphery that is affixed to the sidewall, though the reference member is not located along or integrated into the sidewall.

The reference member may in some examples form two receptacles in the space formed by the sidewall. A first receptacle for receiving substances to be volumetrically measured may be accessed through the upper periphery, while a second receptacle for receiving substances to be volumetrically measured may be accessed through the lower periphery. Thus, at least in some examples, both the upper and lower peripheries of the sidewall provide access to receptacles for measuring the volume of substances. In other words, in some examples there are two measuring receptacles in one invertible measuring cup. In some examples, though, the measuring cup may include a traditional base such that a second receptacle is not included. In these examples, the reference member may be affixed at least one of the sidewall or the base.

Nonetheless, the reference member may include a first set of volumetric indicia that are at least partially upward-facing and can be viewed from above the measuring cup. In some examples, the reference member may further include a second set of volumetric indicia that are at least partially downward-facing and can be viewed from below the measuring cup. In some examples, the reference member may be formed of a columnar ramp that includes a first portion, a second portion that is generally seated on the first portion, and at least one printed insert that is sandwiched between the first and second portions and includes the volumetric indicia. As those having ordinary skill in the art will recognize, the example measuring cups may include a wide variety of other features as disclosed more fully below.

Referring now to FIG. 1A, an example subassembly 100 of an invertible measuring cup is shown. The example subassembly 100 may generally include a sidewall 102, an upper periphery 104, an upper spout 106, a lower periphery 108, a lower spout 110, and a handle 112. The sidewall 102 may include and/or extend between the upper periphery 104 and the lower periphery 108. In some examples, the upper spout 106 may be disposed along the upper periphery 104 of the sidewall 102, at a top end 114 of the subassembly 100, and the lower spout 110 may be disposed along the lower periphery 108 of the sidewall 102, at a bottom end 116 of the subassembly 100. In one example, as shown in FIG. 1A, the example handle 112 is affixed to the sidewall 102 at the upper periphery 104 and at the lower periphery 108. The example handle 112 is advantageous because the handle 112 can be easily grasped regardless of which end 114, 116 is being utilized. In other examples, though, the handle 112 may have a cantilever design such that only one portion of the handle 112 is affixed to the sidewall 102. In either case, the handle 112 may be covered with a rubber or other polymer coating for gripping purposes in some instances.

Further, the subassembly 100 may in some examples be symmetric or substantially symmetric across one or more planes. Symmetry or substantial symmetry may be particularly advantageous in examples where the measuring cup can receive and pour substances from both ends, that is, from the top end 114 and the bottom end 116, as described below. However, the subassembly 100 need not be symmetrical or substantially symmetrical. Furthermore, in some examples the sidewall 102 has a curved structure that promotes laminar inflow and outflow of substances to and from the measuring cup. In these examples, a circumference of the sidewall 102 may be smallest at approximately one-third or one-half of a height of the subassembly 100. In other examples, though, the circumference of the sidewall 102 may be smallest at the lower periphery 108 of the sidewall 102. Because both ends 114, 116 of the subassembly 100 may receive and pour substances, those having ordinary skill in the art will also appreciate that the handle 112 can be formed to facilitate pouring substances out of the top end 114 and the bottom end 116 of the subassembly 100. In still other examples, the sidewall 102 of the subassembly 100 may be straight with minimal or no curvature. In either case, the sidewall 102 may be said to be generally vertical. The sidewall 102 may also be said to encircle a space, one or more portions of which may be used as one or more receptacles for receiving a substance to be volumetrically measured.

The example subassembly 100 shown in FIG. 1A does not include a base. Rather, the subassembly 100 may receive a reference member formed by the components shown in FIGS. 1B-1D, as described below. In one example, an outer periphery of the reference member may be affixed to the subassembly 100 at a position 118, which has been indicated for purposes of illustration along the subassembly 100. Nonetheless, those having ordinary skill in the art will appreciate that many of the principles, features, and example measuring cups disclosed herein may in fact utilize a traditional base (e.g., a planar structure formed across and enclosing the lower periphery 108 of the subassembly 100). While measuring cups having a traditional base may not necessarily be capable of receiving and pouring substances from both ends, many if not virtually all of the benefits disclosed herein may be realized by such measuring cups.

Those having ordinary skill in the art will further appreciate that the subassembly of the measuring cup may take on a variety of shapes and sizes. Thus although the subassembly 100 is shown and disclosed above as being generally circular, the subassembly may be generally triangular, elliptical, polygonal, square, or rectangular, for example. Even in those examples, the sidewall 102 may still be said to "encircle" a space. The outer periphery of the reference member could likewise be modified according to the contour of the subassembly. What's more, the subassembly 100 and other components of the measuring cup may in some examples be made from a variety of materials, including plastic, metal, and glass, for instance. In one example, for instance, the measuring cup may be made of Pyrex®, which is resistant to sudden changes in temperature that may be experienced during use. As a further example, the measuring cup may be molded from any suitable food grade plastic known in the art, such as styrene acrylonitrile (SAN) plastic, for instance.

With reference now to FIGS. 1B-1D, several components of a reference member in the form of an example columnar ramp are shown. In particular, an example first portion 150 of the example columnar ramp is shown in FIG. 1B. In this example, the example first portion 150 has an outer periphery 152 and one or more grooves 154. The example first portion 150 may also include a bottom 156 and a top 158, with a graduated wall 160 extending between the outer periphery 152 at the bottom 156 and the top 158. The graduated wall 160 may have a natural curvature in some examples, which, like the sidewall 102 of the subassembly 100, may promote laminar inflow and outflow of substance to and from the measuring cup. The grooves 154 of the example first portion 150 may be intended to receive printed inserts 180 shown in FIG. 1C, which may be sized and shaped to conform to the grooves 154 of the first portion 150. A first printed insert 182 may be disposed in one of the grooves 154 in the example first portion 150, while a second printed insert 184 may be disposed in another groove 154 of the example first portion 150. Although not shown in FIG. 1C, the printed inserts 180 include volumetric indicia that can be read at least from above and, in some cases, below the columnar ramp. More specifically, the first and second printed inserts 182, 184 may each have an upper surface 186 and a lower surface 188. In examples where the measuring cup can receive and pour substances from both ends 114, 116, each of the upper and lower surfaces 186, 188 of the printed inserts 180 may include volumetric indicia. For instance, a first set of volumetric indicia may be included on the upper surfaces 186 of the printed inserts 180, and a second set of volumetric indicia may be included on the lower surfaces 188 of the printed inserts 180. Moreover, in some examples where two printed inserts 180 are utilized, each printed insert may include different volumetric units. For instance, the first printed insert 182 may have volumetric indicia in Imperial units, while the second printed insert 184 may have volumetric indicia in metric units. As a further example, the first and second printed inserts 182, 184 may have, respectively, incremental volumetric indicia such that the first printed insert 182 has volumetric indicia corresponding to 1 cup, 1½ cup, and the second printed insert 184 has volumetric indicia corresponding to ¾ cup and 1¼ cup.

Nevertheless, FIG. 1D shows an example second portion 200 of the example columnar ramp. The second portion 200 may in some examples be sized and shaped so as to substantially conform to the size and shape of the first portion 150. Similar to the first portion 150, the second portion 200 may include an outer periphery 202, a bottom 204, a graduated wall 206, and a top 208. To form the columnar ramp, the second portion 200 may be placed on top of the first portion 150 so as to sandwich the printed inserts 180 between the first and second portions 150, 200. In one example, the first and second portions 150, 200 of the columnar ramp may be secured to one another, such as by welding in a plastic injection molding machine, for instance, before being affixed to the subassembly 100 at the position 118 shown in FIG. 1A. However in other examples, the first and second portions 150, 200 may be secured to one another when they are affixed to the subassembly 100. In either case, the formation of the columnar ramp prevents substances, whether liquid or solid, from entering any space, however minimal, between the first and second portions 150, 200.

Figure 2:
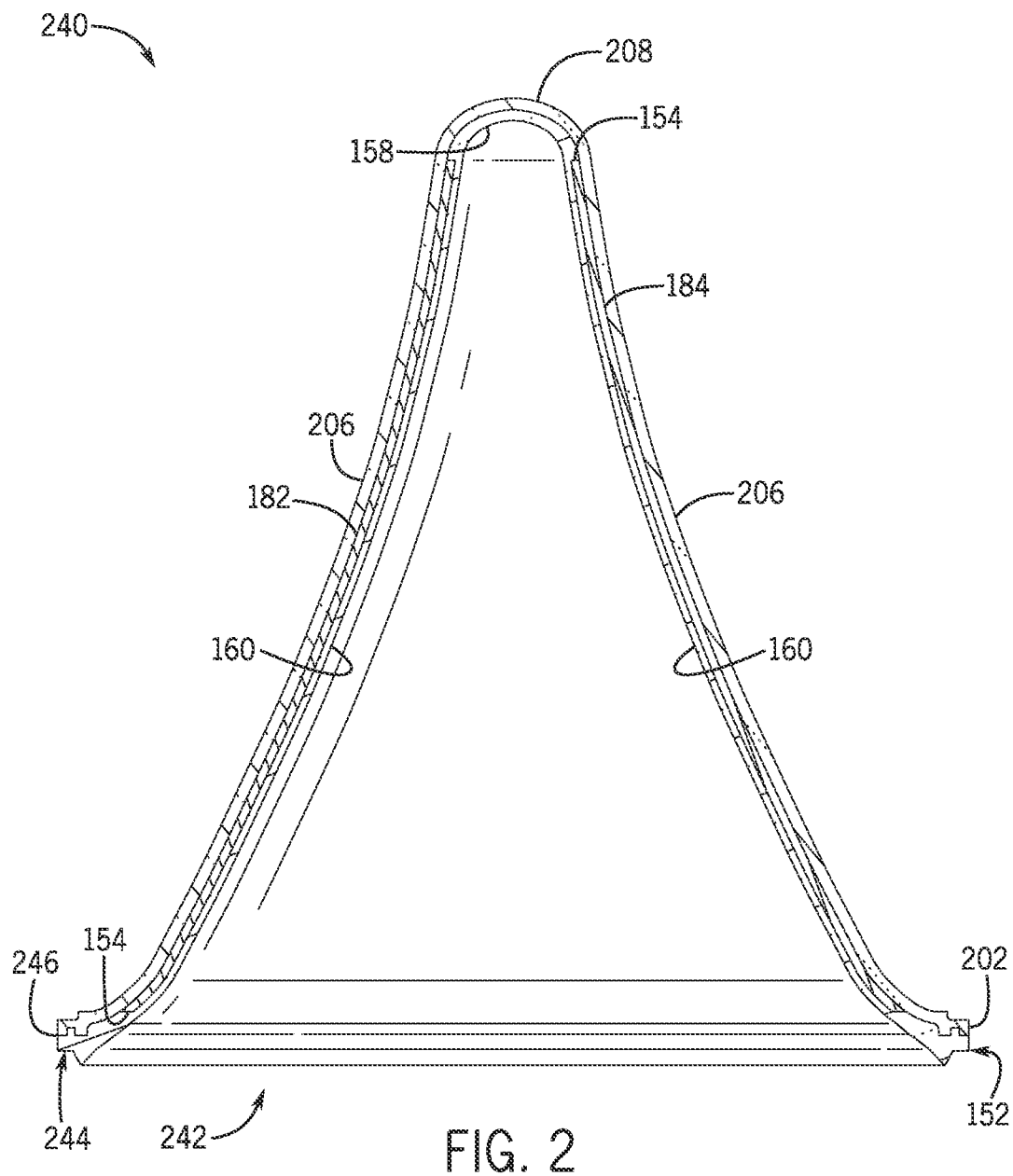
FIG. 2 is a cross-sectional view taken across line 2-2 in FIG. 3 of an example columnar ramp that may be formed of the example printed insert of FIG. 1C, the example first portion of FIG. 1B, and the example second portion of FIG. 1D.
Figure 3:
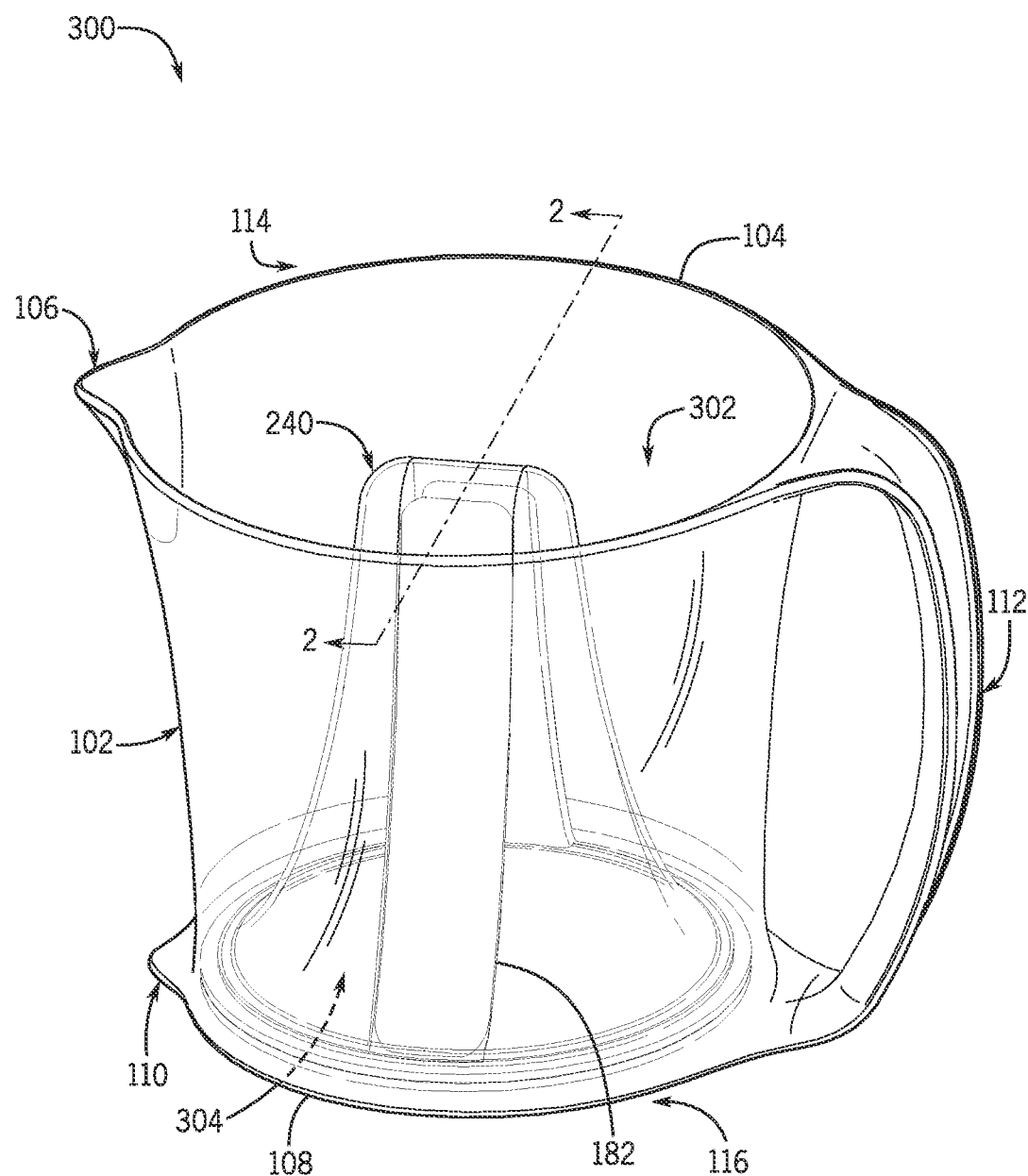
FIG. 3 is a front perspective view of an example measuring cup formed by the example subassembly of FIG. 1A, the example first portion of FIG. 1B, the example printed insert of FIG. 1C, and the example second portion of FIG. 1D.

Turning to FIG. 2, a columnar ramp 240 formed by the first portion 150, the second portion 200, and the printed inserts 180 is shown based on a cross section taken across line 2-2 in FIG. 3. The columnar ramp 240 in FIG. 2 shows more specifically how the first portion 150, second portion 200, and the printed inserts 180 may be assembled to form an example reference member. As described below, the columnar ramp 240 may include an opening 242 for receiving substances after the subassembly 100, to which the columnar ramp 240 is affixed, is inverted. In addition, the columnar ramp 240 may include an interlocking feature 244 that helps secure the first and second portions 150, 200 during pre-assembly stages, during assembly to the subassembly 100, and/or during post-assembly. By way of example, the interlocking feature 244 may help locate the second portion 200 along the first portion 150 to provide an ideal surface 246 to be affixed to the subassembly 100.

The first and second portions 150, 200 of the columnar ramp 240 forming the reference member may be made from a variety of materials, including plastic, metal, and glass, for instance. In one example, for instance, the first and second portions 150, 200 may be made of Pyrex®, which is resistant to sudden changes in temperature that may be experienced during use. As a further example, the first and second portions 150, 200 may be molded from any suitable food grade plastic known in the art, such as styrene acrylonitrile (SAN) plastic, for instance. Due to the structure of the example columnar ramp 240, the first and second portions 150, 200 should be at least partially transparent such that a user of the measuring cup can see through the first and second portions 150, 200 to the volumetric indicia on the printed inserts 180.

Those having ordinary skill in the art will appreciate that the columnar ramp 240 as shown and described need not necessarily be formed of two portions and printed inserts, or the particular features thereof (e.g., the grooves 154). For instance, a columnar ramp substantially similar to that formed by the components in FIGS. 1B-1D could be formed from single piece of material, as opposed to two, three, or more components. The volumetric indicia could be engraved, embossed, stenciled, attached, and/or printed along the upper and lower surfaces of a single-piece columnar ramp much like the volumetric indicia on the printed inserts 180.

Though the reference member disclosed above and in the figures is shown as a columnar ramp, the present disclosure contemplates reference members of a wide variety of shapes and sizes. For example, the reference member may be or resemble a pyramid, a quasi-pyramid, stepped rings, a circular stepped staircase, and/or the like affixed to at least one of the sidewall 102 or a traditional base of a measuring cup. In general, however, the reference member is disposed substantially in a central portion of the space formed by the sidewall 102. In other words, although a portion of the reference member may be affixed to or emanate from the sidewall 102, the reference member is not positioned adjacent to, disposed along, or built into the sidewall 102.

FIG. 3 shows an example measuring cup 300 that has been formed by affixing the outer periphery 152, 202 of the columnar ramp 240 near the lower periphery 108 of the sidewall 102 of the subassembly 100. Volumetric indicia on the first printed insert 182 have again been omitted for purposes of simplicity and clarity. By affixing the columnar ramp 240 to the sidewall 102, a first receptacle 302 and a second receptacle 304 are formed. The first receptacle 302, for example, is formed by a portion of the space around the columnar ramp 240 or, put another way, the space between the columnar ramp 240 and the sidewall 102. Therefore, substances that are poured into the first receptacle 302 for measurement are supported by the sidewall 102 and the second portion 300 of the columnar ramp 240 or, in other words, the reference member. Substances that are poured into the second receptacle 304 for measurement, namely, when the measuring cup 300 is inverted, are supported primarily by the first portion 150 of the columnar ramp 240. In some examples, the columnar ramp 240 is affixed to the sidewall 102 at a position where the bottom 156 of the first portion 150 of the columnar ramp communicates with the lower spout 110 to facilitate a smooth pour when a substance is emptied from the second receptacle 304.

As those having ordinary skill in the art will recognize, the first receptacle 302 at least in the example shown in FIG. 3 is larger than the second receptacle 304 and, therefore, is more appropriate for measuring larger volumes. In addition, having two receptacles for measuring may be advantageous where a liquid is first measured and then a powdery solid is subsequently measured. By inverting the measuring cup 300 after the first measurement and measuring the powdery solid in the opposing measuring receptacle, the powdery solid will not go to waste and stick to the receptacle measuring cup 300, as may otherwise occur where a powdery substance comes in contact with a wet surface.

Figure 4:
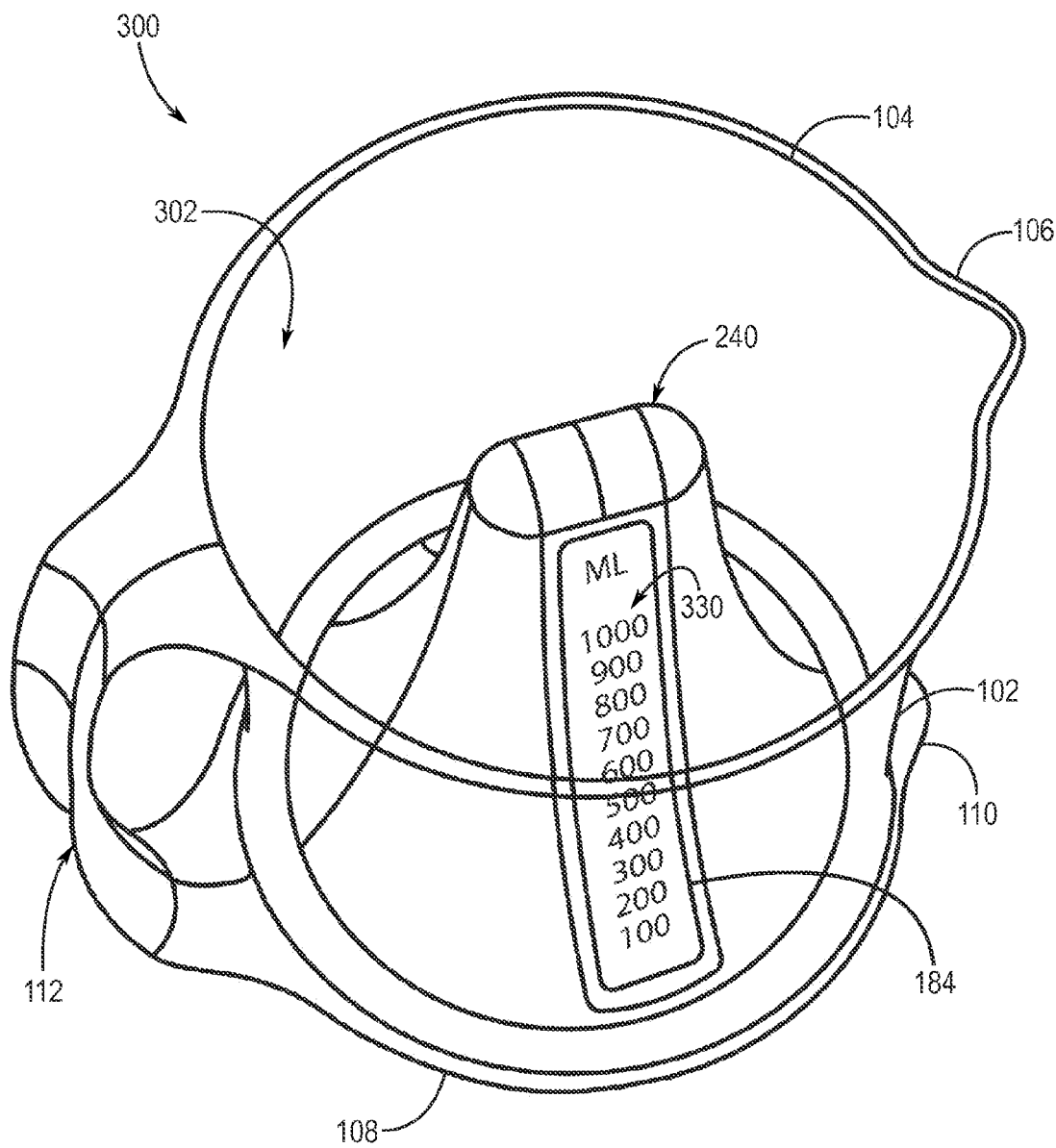
FIG. 4 is a top perspective view of the example measuring cup of FIG. 3, including volumetric indicia disposed along an upper surface of the example printed insert.

FIG. 4 shows the example measuring cup 300 of FIG. 3, but in a top perspective view from another side. The example measuring cup 300 also includes volumetric indicia 330 for indicating the volume of a substance deposited in the first receptacle 302. As shown, the volumetric indicia 330 are at least partially upwards-facing and hence readable from above the measuring cup 300.

Figure 5:
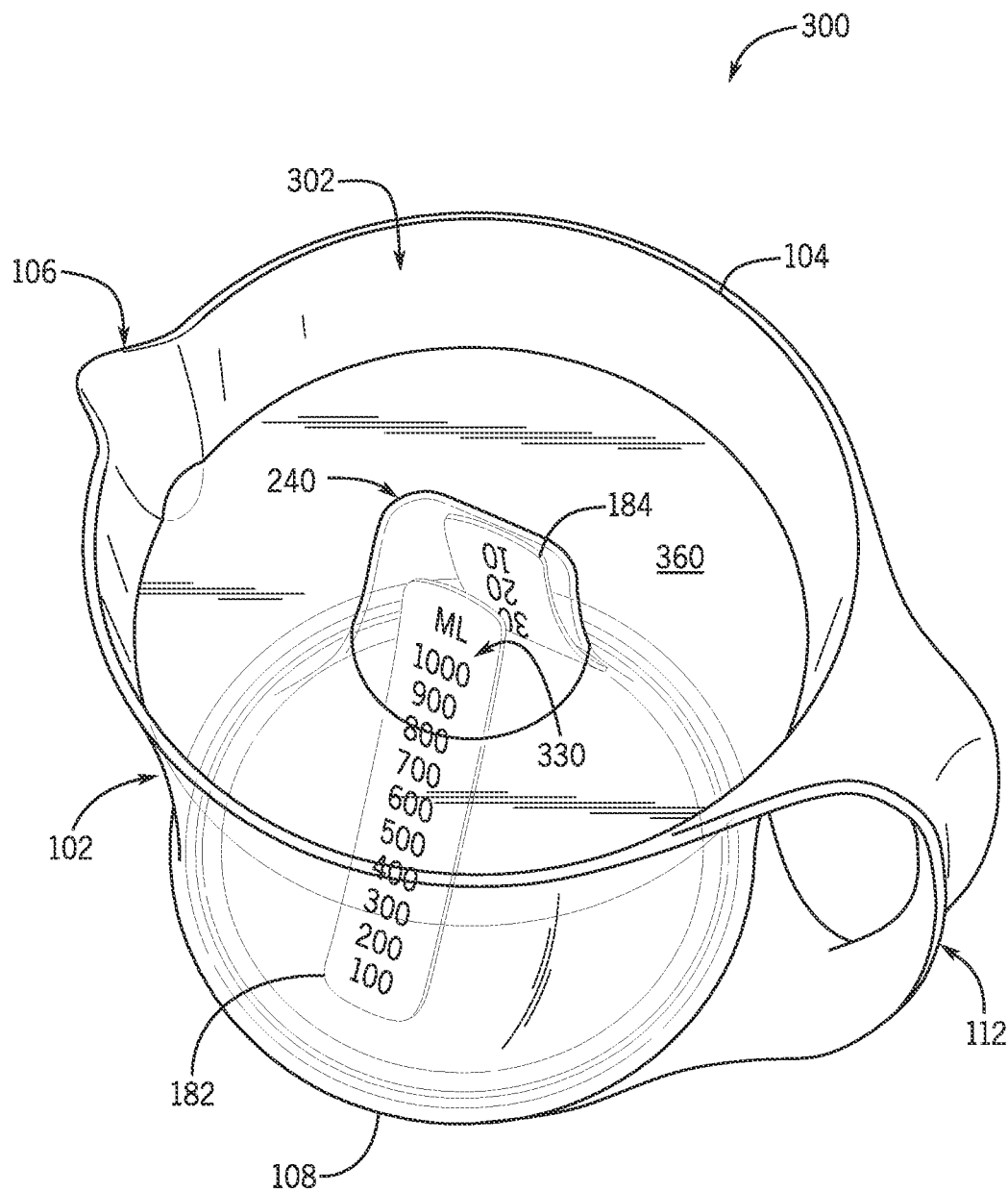
FIG. 5 is a top perspective view of the example measuring cup, including liquid disposed within the example measuring cup.

With reference now to FIG. 5, the example measuring cup 300 is shown with a liquid substance 360 deposited within the first receptacle 302. Although horizontal lines adjacent to the volumetric indicia 330 and fractional lines have been omitted from the figures those having ordinary skill in the art will understand that more precise indicia are within the scope of the present disclosure. That said, the volume of the liquid substance 360 deposited in the first receptacle 302 of the measuring cup 300 is shown to be 900 milliliters (mls), as can be read from above the printed insert 182 of the columnar ramp 240, and above the measuring cup 300 generally.

Figure 6:
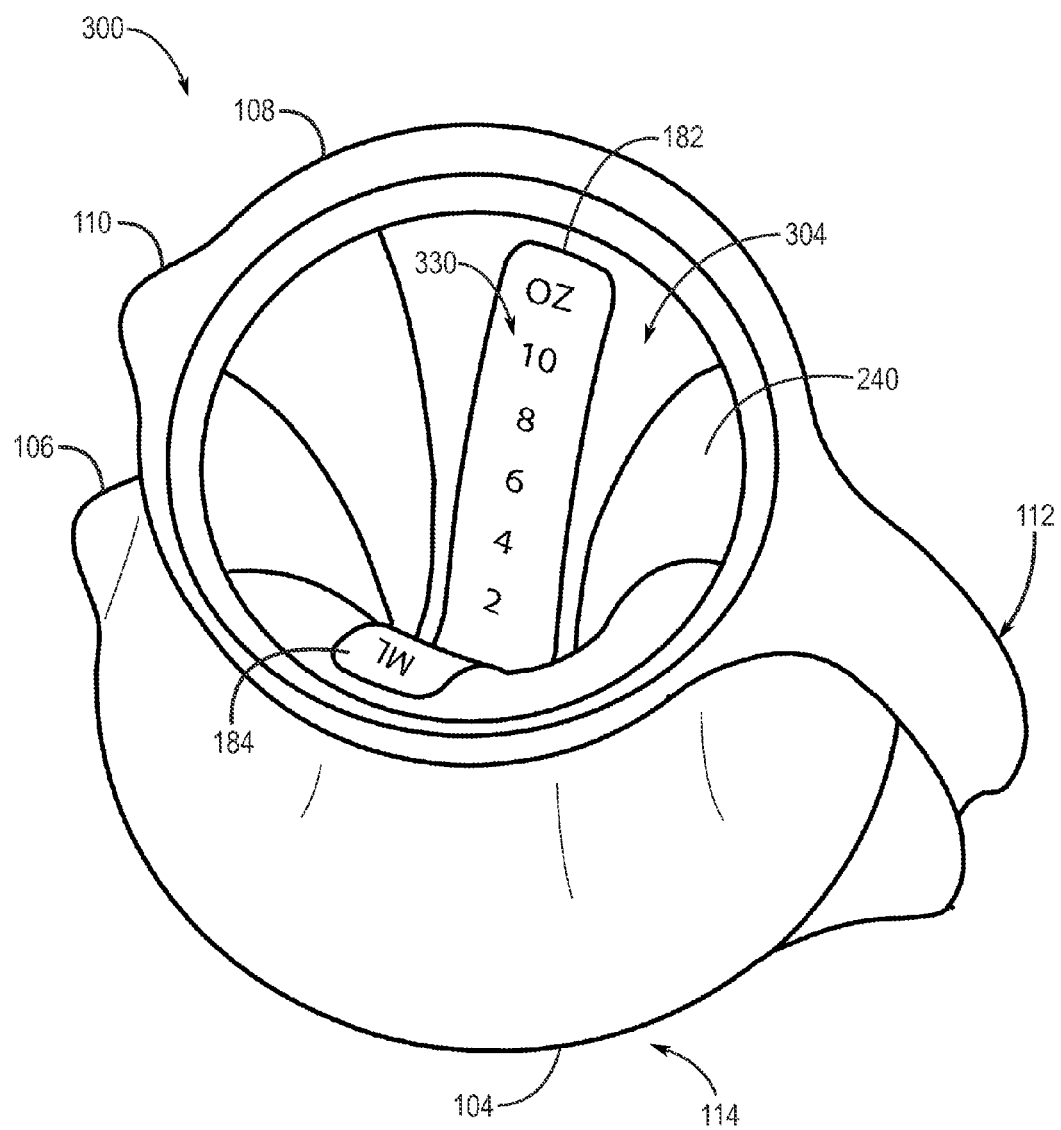
FIG. 6 is a bottom perspective view of the example measuring cup, including volumetric indicia disposed along a lower surface of the example printed insert.

Now referring to FIG. 6, the example measuring cup 300 is shown in an inverted position, providing direct access to the second receptacle 304. Notably, the measuring indicia 330 disposed on the printed insert 182 is oriented such that it is "right-side up" when looking into the second receptacle 304 of the measuring cup 300. Put another way, because FIG. 6 shows the "bottom" of the measuring cup 300, it can be said that the volumetric indicia 330 are at least partially downwards-facing with respect to the top end 114 and the bottom end 116 designations. FIG. 6 illustrates the invertible nature of the measuring cup 300, at least according to some examples. Further, although the volumetric units 330

Thus to fill the measuring cup 300 from either end, all the user needs to do is place the measuring cup 300 on a horizontal work surface and fill the measuring cup 300, looking from above until the volumetric indicia 330 for the desired volume begins to be covered with the substance, which may either be in liquid or solid form. Accordingly, the user need not bend down and view the measuring cup 300 from the side or otherwise lower his or her head to the level of the countertop or work surface. Furthermore, because a meniscus should be measured at its center, the user will be reading the appropriate volumetric indicium as the reference member is disposed at a central portion of the measuring cup.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A measuring cup comprising:
a sidewall that is generally vertical and encircles a space, the sidewall having an upper periphery and a lower periphery;
a handle extending from the sidewall;
a spout disposed along the upper periphery of the sidewall;
a reference member disposed substantially in a central portion of the space formed by the sidewall, the reference member having volumetric indicia that are at least partially upwards-facing; and
a receptacle capable of receiving a substance, the receptacle formed by a portion of the space between the reference member and the sidewall, wherein the volumetric indicia of the reference member indicate a volume of the substance deposited in the receptacle; and
a second receptacle capable of receiving a substance, the second receptacle being different than the receptacle formed by the portion of the space around the reference member, wherein the second receptacle is accessible through the lower periphery of the sidewall.

2. The measuring cup of claim 1, wherein an outer periphery of the reference member is affixed to the sidewall.

3. The measuring cup of claim 1, further comprising a lower spout disposed along the lower periphery of the sidewall, the lower spout being in communication with the second receptacle.

4. The measuring cup of claim 1, further comprising a base attached to and enclosing the lower periphery of the sidewall, wherein the reference member is affixed to the base.

5. The measuring cup of claim 1, wherein the reference member is a columnar ramp comprising a first portion, a second portion, and at least one printed insert, wherein the volumetric indicia are disposed on the at least one printed insert, wherein the at least one printed insert is positioned between the first portion and the second portion when the columnar ramp is assembled.

6. The measuring cup of claim 5, wherein the volumetric indicia comprise a first set of at least partially upward-facing indicia and a second set of at least partially downward-facing indicia.

7. The measuring cup of claim 5, wherein each of the first portion and the second portion has a graduated wall that slopes from an outer periphery to a top.

8. The measuring cup of claim 1, wherein a shape of the reference member is at least one of a pyramid, stepped rings, or a circular stepped staircase.

9. The measuring cup of claim 1, wherein the handle is affixed at the upper periphery of the sidewall and the lower periphery of the sidewall.

10. The measuring cup of claim 1, wherein a circumference of the sidewall is smallest at the lower periphery of the sidewall.

11. A measuring cup comprising:
a base;
a sidewall that is generally vertical and encircles a space, the sidewall having an upper periphery and a lower periphery, with the base being attached to and enclosing the lower periphery of the sidewall;
a spout disposed along the upper periphery of the sidewall;
a handle extending from the sidewall;
a reference member disposed above the base and substantially in a central portion of the space formed by the sidewall, the reference member having volumetric indicia that are at least partially upwards-facing, the reference member being affixed to at least one of the sidewall or the base; and
a receptacle capable of receiving a substance through the upper periphery, the receptacle formed by a portion of the space around the reference member, wherein the volumetric indicia of the reference member indicate a volume of the substance deposited in the receptacle;
wherein the reference member is a columnar ramp comprising a first portion, a second portion, and at least one printed insert positioned between the first portion and the second portion, wherein the volumetric indicia are disposed on the at least one printed insert.

12. The measuring cup of claim 11, wherein an outer periphery of the columnar ramp is affixed to at least one of the base or the sidewall.

13. The measuring cup of claim 11, wherein each of the first portion and the second portion has a graduated wall that slopes from an outer periphery to a top.

14. A measuring cup comprising:
   a sidewall that is generally vertical and encircles a space, the sidewall having an upper periphery and a lower periphery;
   a handle extending from the sidewall;
   an upper spout disposed along the upper periphery of the sidewall;
   a lower spout disposed along the lower periphery of the sidewall;
   a reference member disposed substantially in a central portion of the space formed by the sidewall, the reference member having a first set of volumetric indicia that are at least partially upwards-facing and second set of volumetric indicia that are at least partially downwards-facing;
   a first receptacle capable of receiving a first substance, the first receptacle formed by a portion of the space around the reference member, wherein the first set of volumetric indicia of the reference member indicate a volume of the first substance deposited in the first receptacle; and
   a second receptacle capable of receiving a second substance, the second receptacle accessible through the lower periphery of the sidewall, wherein the second set of volumetric indicia of the reference member indicate a second volume of the second substance deposited in the second receptacle.

15. The measuring cup of claim 14, wherein an outer periphery of the reference member is affixed to the sidewall.

16. The measuring cup of claim 14, wherein the reference member is a columnar ramp comprising a first portion, a second portion, and at least one printed insert, wherein the first and second sets of volumetric indicia are disposed on the at least one printed insert, wherein the at least one printed insert is positioned between the first portion and the second portion when the columnar ramp is assembled.

17. The measuring cup of claim 14, wherein a shape of the reference member is at least one of a pyramid, stepped rings, or a circular stepped staircase.

* * * * *